United States
Aiken

3,797,914

Mar. 19, 1974

[54] DISPLAY DEVICE EMPLOYING LIQUID CRYSTAL MATERIALS

[75] Inventor: William Ross Aiken, Los Altos Hills, Calif.

[73] Assignee: Display Technology Corporation, Cupertino, Calif.

[22] Filed: Jan. 11, 1973

[21] Appl. No.: 322,707

Related U.S. Application Data

[63] Continuation-in-part of Ser. No. 126,054, March 19, 1971, abandoned.

[52] U.S. Cl........ 350/160 LC, 40/130 R, 240/46.31
[51] Int. Cl................................................ G02f 1/16
[58] Field of Search ... 350/160 LC; 240/107, 46.31; 40/130 R

[56] References Cited
UNITED STATES PATENTS
3,653,138   4/1972   Cooper.................... 350/160 LC X Primary Examiner—Edward S. Bauer

[57] ABSTRACT

A display device settable between transparent and translucent or opaque conditions comprising of a layer of a material changeable between light-transmitting and light-scattering conditions in response to electric fields, such as the liquid crystal materials, means for setting up electric fields through said layer, a plurality of superposed relatively spaced, slanting slats located behind the rear face of said layer, said slats having dark, light absorbing front surfaces and bright, light-reflecting rear surfaces, a source of light located behind said slats adjacent the rear ends thereof, for the slats to conduct the light generated by said source obliquely through said layer in such a manner that it misses the eyes of an observer in front of said layer, and a cover arranged over said source of light and having a light-reflecting inner surface.

4 Claims, 3 Drawing Figures

FIG_2

DISPLAY DEVICE EMPLOYING LIQUID CRYSTAL MATERIALS

This is a continuation-in-part of my pending U.S. patent application Ser. No. 126,054 filed Mar. 19, 1971, and now abandoned for a DISPLAY DEVICE EMPLOYING LIQUID CRYSTAL MATERIALS.

The present invention relates to light control devices which are settable between transparent and opaque or partially opaque, i.e., translucent conditions, and which employ materials that are changeable between light-transmitting and light-scattering or light-reflecting conditions by the application and/or withdrawal of electric fields. Examples of such materials are liquid suspensions of dipolar or assymetric particles, or the substances known as "liquid crystal materials." When light control devices of this type are employed in display apparatus intended to present sharply contrasting display fields to an observer, and are associated with rearwardly disposed sources of light to enhance the effect of their different display positions, there arises the problem that the sources of light become visible to the observer when the light-transmission-changeable material is in its light-transmitting or transparent condition, and may thus interfere with the integrity of the intended display. This problem is particularly pressing in display devices employing layers of liquid crystal materials because these materials depend on a source of light for proper operation and can only be effectively changed to light-scattering, i.e., translucent, opaque or partially opaque condition if the light passes from its source through the layer of liquid crystal material in a forward direction, i.e., toward the viewer's eyes. They seemingly remain in light-transmitting or transparent condition when the light travels through them in the opposite direction, i.e., away from the observer's eyes.

It is an object of my invention to provide a display device of the type described, that may be set from transparent to translucent or opaque condition without interference with, or impairment of, its intended display in transparent condition.

More specifically, it is an object of the invention to provide a display device of the type described, which does not expose the source of light or present unwanted reflections of the observer and/or his environment when in transparent condition.

It is yet another object of the present invention to so arrange a display device, of the type referred to, as to incur a minimum loss of the available light.

Still another object of the invention is to so arrange a display device of the type referred to, that it is compact and yet provides uniformity, and fullest utilization, of the light generated by the source of light.

An additional object of the invention is to provide an arrangement for display devices of the type referred to, that makes it possible to construct it in any physical size desired including such large dimensions as are required for road signs, bill boards and the like, without danger of warping under the influence of its weight, sun light or high ambient temperatures.

These and other objects of the present invention will be apparent from the following description of the accompanying drawings which illustrate certain preferred embodiments thereof and wherein.

In accordance with the invention I provide a display device of the type generally described, with means that direct light from a source of light obliquely through the layer of light-transmission-changing material from the rear face to the display face in a direction designed to miss the eye of an observer on the side of the layer opposite to the source of light. For this purpose a louver arrangement is interposed between the rear face of the layer of light-transmission-changing material and the source of light, in the form of a series of superposed, relatively spaced, obliquely positioned slats that direct the light from said source obliquely towards and through the layer of light-transmission-changing-material from the rear face to the front face thereof in a direction wherein it misses the viewer's eyes. Thus, in the transparent condition of the device, the viewer can only see the surfaces of the slats which face the rear face of light-transmission-changing-material and which may be painted in a solid dark color or in black so that the viewer sees only a black or dark area. However, when the device is set to opaque or partially opaque, i.e., translucent condition, the light passing obliquely through the layer of liquid crystal in a forward direction is scattered and the device presents a frosted non-transparent surface to the viewer's eyes, and thus provides to the viewer in front of the device a light output of a different level than presented to him when the device is in its transparent condition. By locating the source of light at levels approximately intermediately between each two superposed slats adjacent the bottom ends thereof, and by painting the rear surfaces of the slats in a bright, light-reflecting color, such as white, and by placing the source of light and the louvers under a cover whose inner surface is painted in a bright, light-reflecting color, utmost utilization of the light generated by the source of light is secured without the use of costly, space-consuming and mechanically vulnerable parabolic reflectors.

Figure 1:
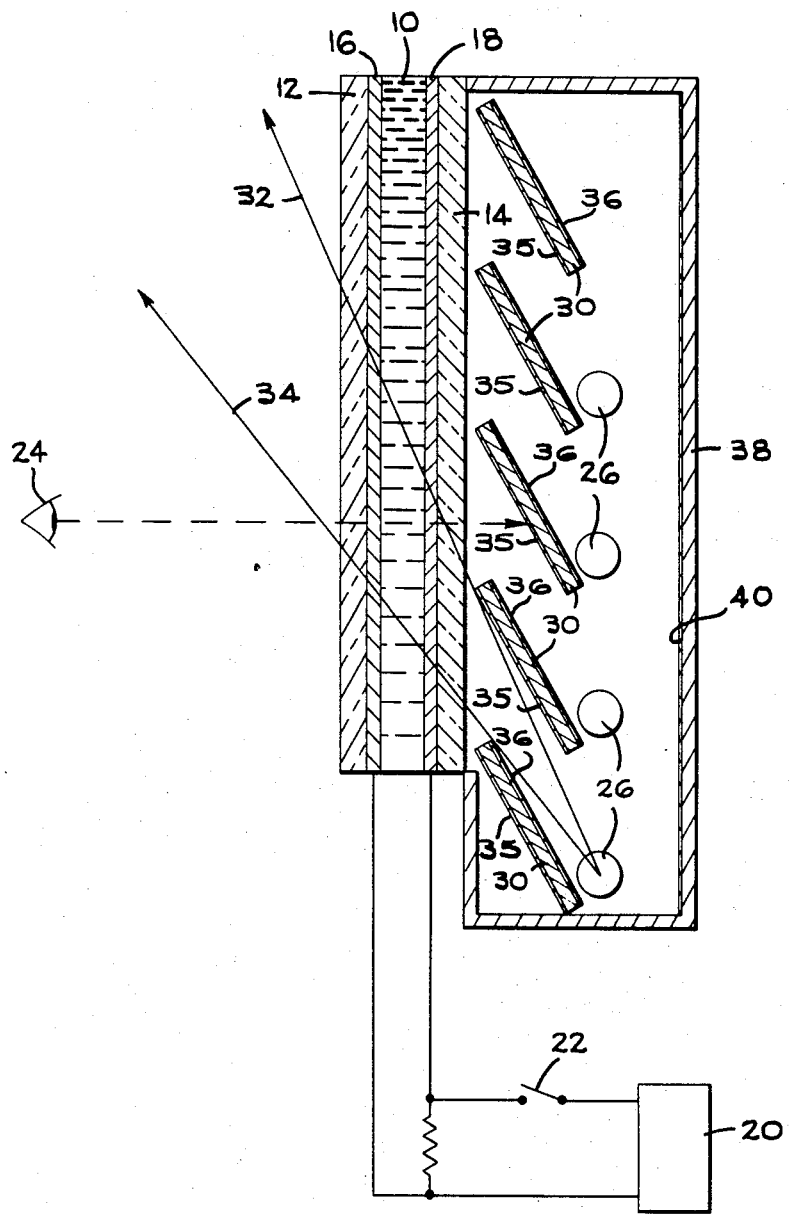
FIG. 1 is a schematic side elevation of a vertical section through a display device embodying my invention in its transparent condition.

Having reference to the FIG. 1, the numeral 10 designates a layer of nematic liquid crystal material, such as anysylidene-p-aminophenylacetate which is contained at either side by covers 12 and 14 of a transparent material, such as glass. It should be understood that the showing of the figure is schematic, and while the layer of liquid crystal material has been shown, for reasons of clarity of illustration, as being substantially greater in thickness then the containing covers 12 and 4, the opposite is usually true and the described device may be produced by placing a drop of the liquid crystal compound therebetween. Both covers are provided with thin films 16 and 18 of a transparent electrically conductive material, such as transparent films of thin oxide. Both these films are connected to a source of electric power 20 through a switch 22. This source of power should supply from between 6 to 60 volts as is well known by those skilled in the art. The observer's position with regard to the display device is symbolically indicated by the eye 24.

Provided behind the rear face of the device is an array of vertically superposed sources of illumination, for instance, a set of relatively spaced, horizontally disposed, fluorescent tubes 26 that extend parallel to the rear face of cover 14. Interposed between said rear face and the set of fluorescent tubes 26 is a louver arrangement formed by a plurality of relatively spaced, vertically superposed, inclined, parallel slats 30, the arrangement being such that each two directly superposed slats 30 are located direclty above and below, respectively, of a source of light 26; or to express it conversely, each source of light 26 is located intermediately of, and adjacent the bottom ends of two superposed slats 30.

The slats 30 are arranged to overlap as viewed from the observer's side, and their degree of inclination is such that they direct even the light emitted by the lowest one of the fluorescent tubes 26 upwardly at an oblique angle through the layer of liquid crystal compound 10 in such a manner that it misses the observer's eyes, as indicated by the rays 32 and 34. The faces of the slats 30 which confront the outer face of cover 14 are painted in a dark color or black, as indicated at 35 in FIGS. 1 and 2. Thus, when the observer views the device of the invention through it front cover 12 with the control switch 22 open and the layer of crystal material in transparent condition, the field presented to the observer is dark or black, and he will not be aware of the illumination behind the louver arrangement 30. Now, let switch 22 of the source of power 20 be closed to set up an electrostatic field between conductive films 16 and 18 through the layer of liquid crystal material 10. The light directed by the louver arrangement obliquely through the layer of liquid crystal compound in an upward direction is immediately scattered in "forward" direction with regard to the observer, and the display field presented to the observer by the device of the invention assumes a frosted or milky appearance. Thus, the device of the invention provides differing levels of light output since it is possible by the simple closure of switch 22 to change the display area of the device from a homogeneously dark or black color to a homogeneously bright, frosted color.

Figure 2:
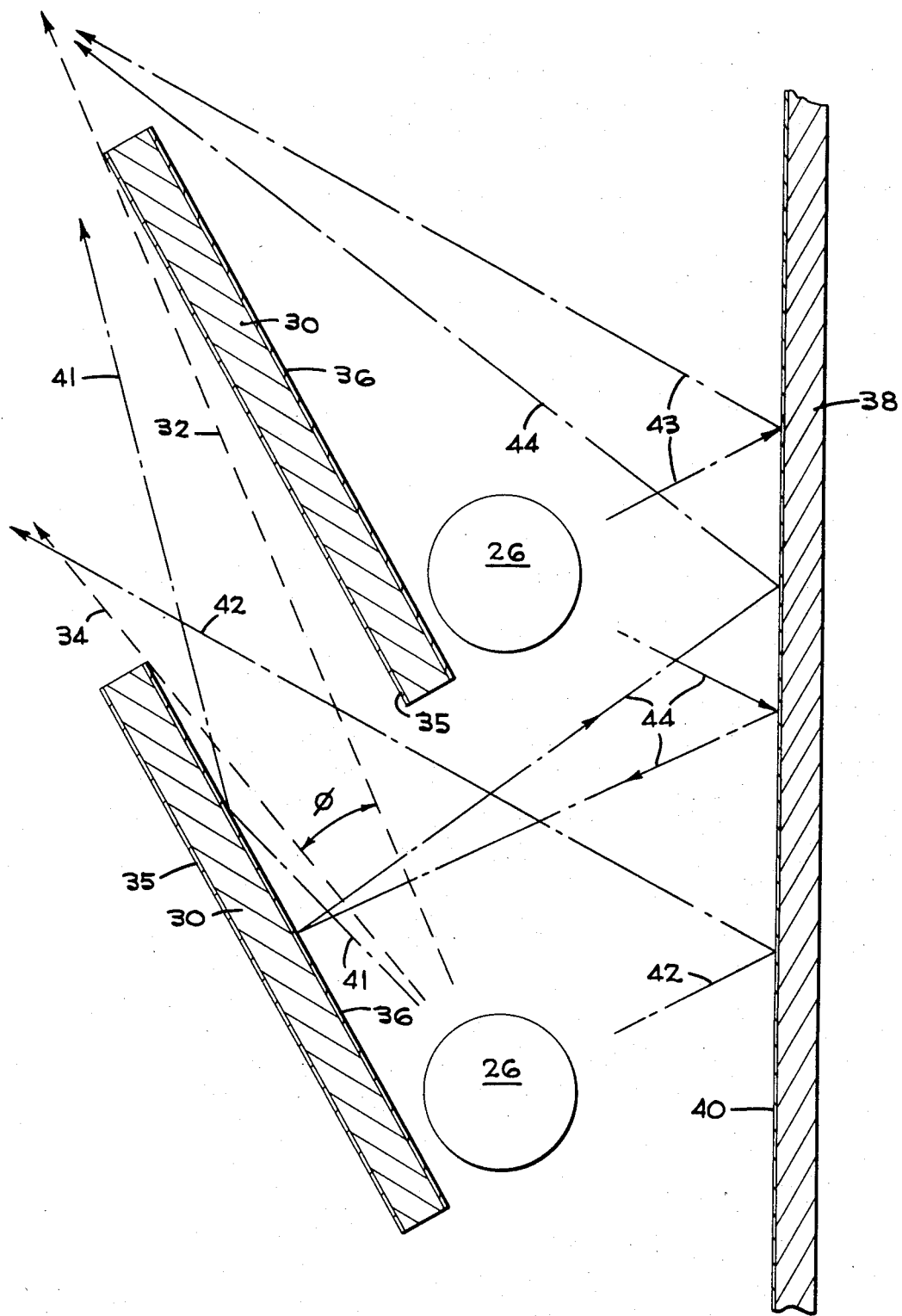
FIG. 2 is an enlarged detail view illustrating the manner in which the light generated by tubular sources of light is utilized to the fullest extent by the arrangement of the present invention.

To hold any loss of light at a minimum and to utilize the light generated by the tubular sources of light to the fullest extent, the rear faces of the slats are provided with a coat of a bright light-reflecting paint as indicated at 36 in FIGS. 1 and 2, and the entire louver and lamp arrangement may be enclosed by a cover 38 whose floor is provided with a coat of a light-reflecting paint as indicated at 40. Without the light-reflecting nature of the rear surfaces of the slats 30 only the sector $\phi$ of the light generated by a source of light 26 would be utilized, and the light generated by the remaining sectors of the tubular sources of light would be lost. However, due to the light-reflecting nature of the rear faces of the slats 30 and of the floor of cover 38 most of the light generated by the sources of light 26 outside of sector $\phi$ is usefully redirected toward and through the layer of light-transmission-changeable-material 10, as indicated by the reflected rays 41, 42, 43 and 44 in FIG. 2.

Figure 3:
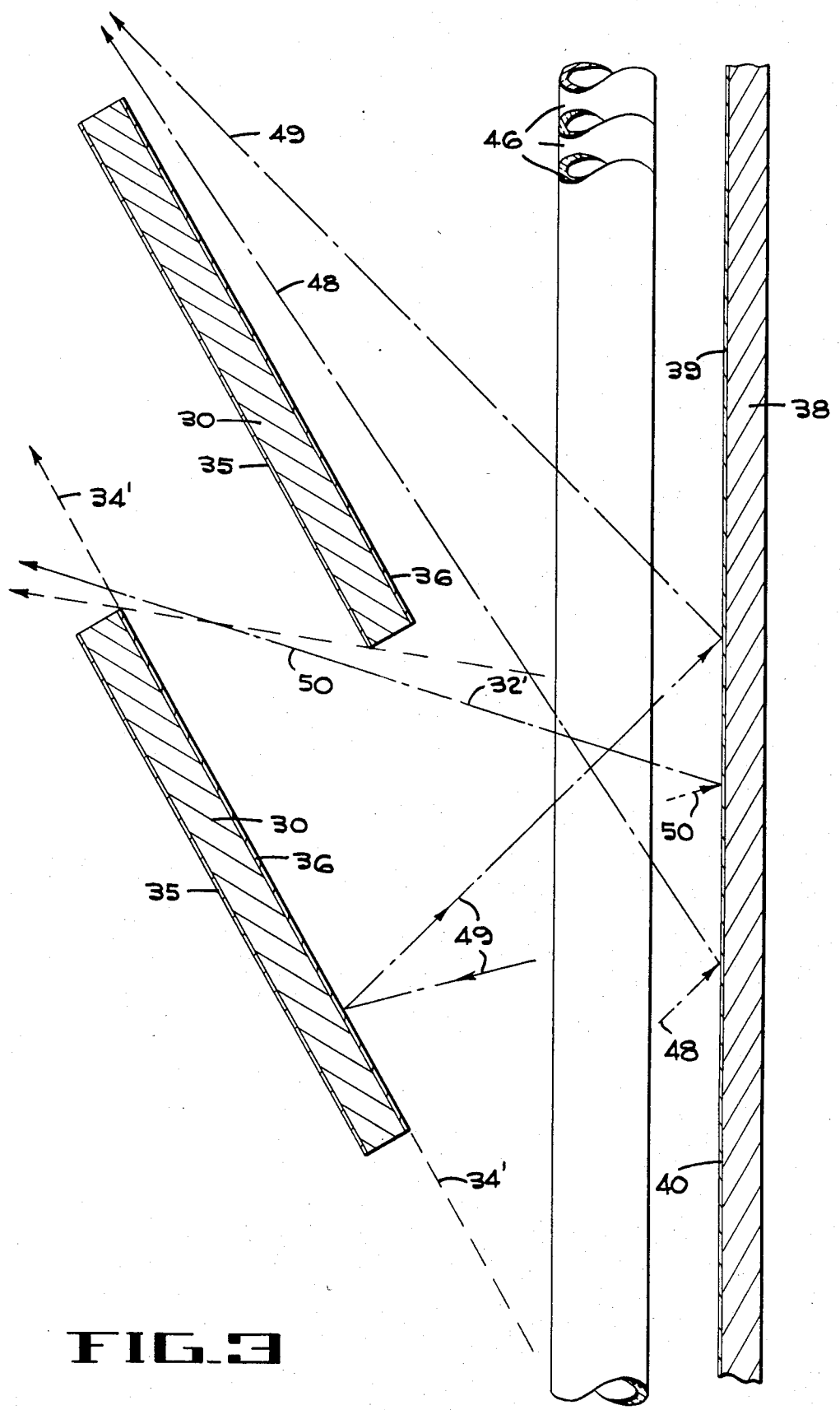
FIG. 3 is an enlarged detail view, similar to FIG. 2, illustrating another embodiment of the invention.

The embodiment of the invention represented by FIG. 3 differs from the embodiment represented by FIGS. 1 and 2 only insofar as the source of light behnd the louver arrangement comprises a plurality of juxtaposed, vertically disposed, tubular light generators 46. While normally only the directly emitted light between the beams 32' and 34' marked out in FIG. 3 would find useful employment in providing a display. The light-reflecting nature of the rear surfaces 36 of the slats 30 and the light-reflecting nature of the layer 39 on the back wall presented by the floor of the cover 38 is effective to re-direct most of the light generated by the tubular light sources 46 obliquely toward and through the layers of light-transmission-changeable-materials, as indicated by the rays 48, 49 and 50.

The arrangement of my invention is of simple, compact, inexpensive and rugged construction. It does not require the use of expensive, space-consuming and mechanically vulnerable reflectors to direct light parallel to the louvers toward and through the layer of light-transmission-changeable-material. It is not subject to warping and buckling under the influence of weight, light and heat as are louvered continua, not does it incur the loss of light occasioned by the necessity of the light having to pass through a plastic rather than air; and the existance of air spaces between the superposed slats makes it possible for cooling air to be circulated between the louver slats, which is an important factor in display devices that are used in sun light and subject to great changes in the temperature of their environment.

It will be obvious to the man skilled in the art that other light-control and display devices employing materials which change their light-transmission-characteristics in response to the presence and/or absence of electric fields, benefit from the particular louver arrangement of my invention such as display devices making use of smectic of cholesteric liquid crystal materials, and suspensions containing particles capable of being oriented into light-scattering, light-reflecting and/or light-passing conditions by the application of electrostatic of electromagnetic fields.

I claim:

1. An adjustable display device comprising a layer of a material changeable between light-transmitting and scattering conditions in response to electric fields and having a front face and a rear face, means for setting up electric fields through said layer, a number of relatively spaced, superposed, slanting slats located behind the rear face of said layer, said slats having dark front faces and light-reflecting rear faces, and a source of light located behind and adjacent to the rear ends of said slats, for said slats to conduct the light generated by said sources toward and through said layer obliquely to said rear face thereof in such a manner as to miss the eyes of an observer in front of the front face of said layer.

2. An adjustable display device according to claim 1 wherein said light-transmission-changeable-material is a liquid crystal material.

3. An adjustable display device according to claim 1 including a rear wall located behind said source of light and having a bright, light-reflecting surface.

4. An adjsutable display device according to claim 1 wherein said source of light comprises a number of superposed tubular light generators located at levels intermediately of the levels of said slats.

* * * * *